US011758880B2

(12) United States Patent
Lin et al.

(10) Patent No.: US 11,758,880 B2
(45) Date of Patent: Sep. 19, 2023

(54) OBJECT SUPPLYING ASSEMBLY, OBJECT CASTING ASSEMBLY AND OPERATION METHOD OF OBJECT DISTRIBUTION SYSTEM

(71) Applicant: AmTRAN TECHNOLOGY Co., Ltd., New Taipei (TW)

(72) Inventors: Huang-Pin Lin, New Taipei (TW); Chung-Hsien Huang, New Taipei (TW)

(73) Assignee: AmTRAN TECHNOLOGY Co., Ltd., New Taipei (TW)

( * ) Notice: Subject to any disclaimer, the term of this patent is extended or adjusted under 35 U.S.C. 154(b) by 184 days.

(21) Appl. No.: 17/213,212

(22) Filed: Mar. 25, 2021

(65) Prior Publication Data

US 2021/0298268 A1 Sep. 30, 2021

Related U.S. Application Data

(60) Provisional application No. 63/002,357, filed on Mar. 31, 2020.

(30) Foreign Application Priority Data

Mar. 8, 2021 (TW) ................................. 110108080

(51) Int. Cl.
*A01K 5/02* (2006.01)
*A01K 15/02* (2006.01)

(52) U.S. Cl.
CPC ............ *A01K 5/0225* (2013.01); *A01K 15/02* (2013.01)

(58) Field of Classification Search
CPC .. A01K 5/0114; A01K 5/0233; A01K 5/0241; A01K 5/0258; A01K 5/0275;

(Continued)

(56) References Cited

U.S. PATENT DOCUMENTS 2,098,618 A * 11/1937 Dostert ..................... A01C 1/08
137/99
2,793,791 A * 5/1957 Clark ................... A01K 5/0275
222/650

(Continued)

FOREIGN PATENT DOCUMENTS

CN 105540171 5/2016
CN 205328047 6/2016

(Continued)

OTHER PUBLICATIONS

"Office Action of China Counterpart Application", dated Aug. 25, 2022, p. 1-p. 7.

(Continued)

*Primary Examiner* — Ebony E Evans
(74) *Attorney, Agent, or Firm* — JCIPRNET

(57) ABSTRACT

An object supplying assembly includes a storage tank having first and second spaces communicating with each other, a rotating member disposed in the second space and including a recess, a driving module, and a partition board including a partition opening misaligned with the first space. An object can enter the recess from the first space. The rotating member rotates, the object is brought by the rotating member and turns around with the recess. When the recess is aligned with a position of the partition opening, the object is allowed to drop and pass through the partition opening. An object casting assembly includes a housing, an impeller rotatably disposed within the housing and including a plurality of blades, and a driver. Accommodating portions are formed among the blades. When the impeller is driven by the driver and rotates, the accommodating portions face a casting opening of the housing by turns.

20 Claims, 13 Drawing Sheets

(58) Field of Classification Search
CPC .... A01K 5/0283; A01K 5/0291; A01K 15/02; A01K 15/021; A01K 15/025
See application file for complete search history.

(56) References Cited

U.S. PATENT DOCUMENTS

| | | | | |
|---|---|---|---|---|
| 4,226,335 | A * | 10/1980 | Sowards | A01K 97/04 221/266 |
| 4,279,221 | A * | 7/1981 | Arvizu | A01K 5/0291 119/51.11 |
| 6,789,503 | B1 * | 9/2004 | Gao | A01K 5/0291 119/51.11 |
| 10,028,488 | B2 | 7/2018 | Hsu et al. | |
| 10,602,716 | B2 * | 3/2020 | McAdams | A01K 5/002 |
| 2012/0048201 | A1 * | 3/2012 | Qian | A01K 5/0291 119/61.2 |
| 2016/0227737 | A1 | 8/2016 | Dzamba | |
| 2016/0295836 | A1 * | 10/2016 | Cheng | A01K 15/025 |
| 2018/0295807 | A1 * | 10/2018 | Hsu | A01K 15/021 |
| 2019/0133075 | A1 | 5/2019 | Holovin et al. | |
| 2020/0396959 | A1 * | 12/2020 | Bahr | A01K 5/0291 |
| 2021/0315185 | A1 * | 10/2021 | Qiu | A01K 15/021 |
| 2022/0079115 | A1 * | 3/2022 | Tsai | A01K 5/0275 |

FOREIGN PATENT DOCUMENTS

| | | | | |
|---|---|---|---|---|
| CN | 205865534 | | 1/2017 | |
| CN | 108967233 | | 12/2018 | |
| CN | 108967234 | | 12/2018 | |
| CN | 109952968 | A * | 7/2019 | ........... A01K 5/0225 |
| EP | 0109104 | A1 * | 10/1983 | ............... A01K 5/02 |
| EP | 0109104 | A1 * | 5/1984 | ........... A01K 5/0275 |
| EP | 0196125 | A2 * | 2/1986 | ............... A01K 5/02 |
| EP | 3450357 | | 3/2019 | |
| KR | 890007671 | Y1 * | 10/1989 | ........... A01K 5/0114 |
| KR | 20140026921 | A * | 3/2014 | ............... A01K 5/02 |
| KR | 20200077308 | A * | 6/2020 | ........... A01K 15/025 |
| TW | M460531 | | 9/2013 | |
| WO | WO-2021031823 | A1 * | 2/2021 | ........... A01K 5/0275 |

OTHER PUBLICATIONS

Office Action of Taiwan Counterpart Application, dated Oct. 19, 2021, pp. 1-5.

"Office Action of Taiwan Counterpart Application", dated Jul. 5, 2022, p. 1-p. 10.

* cited by examiner

OBJECT SUPPLYING ASSEMBLY, OBJECT CASTING ASSEMBLY AND OPERATION METHOD OF OBJECT DISTRIBUTION SYSTEM

CROSS-REFERENCE TO RELATED APPLICATION

This application claims the priority benefits of U.S. provisional application Ser. No. 63/002,357, filed on Mar. 31, 2020 and Taiwan application serial no. 110108080, filed on Mar. 8, 2021. The entirety of the above-mentioned patent applications is hereby incorporated by reference herein and made a part of this specification.

BACKGROUND

Technical Field

The disclosure relates to an object supplying assembly, an object casting assembly and an operation method of an object distribution system, and in particular, relates to an object supplying assembly and an object casting assembly of an object distribution system and an operation method of an object distribution system.

Description of Related Art

In recent years, Internet of Things devices have gradually become popular in various fields. Through the use of Internet of Things devices, a pet owner away from home can remotely observe the pet's activities via a remote control camera and interact with the pet in real time. For instance, a treat dispensing system is currently available on the market. A pet owner can remotely control the treat dispensing system such that the treat supplying unit of the treat dispensing system fills the stored treats into the shooting unit of the treat dispensing system, and the shooting unit shoots the treats to attract the pet. In this way, the pet owner may actually interact with the pet and urge the pet to make activities in response. In addition, the treats can attract the pet to stay in front of the camera so the owner can easily observe the pet.

In the existing treat dispensing system, the shooting unit uses a pushing member with elastic spring to push out the stored treats toward a straight direction. Nevertheless, the supply of treats is unstable because sometimes no treat is filled by the treat supply unit and sometimes multiple treats are filled into to the pushing member of the shooting unit. Besides, in the existing shooting unit, the treats are pushed by the pushing member with elastic spring to eject, but trajectory thereof is irregular and difficult to control. In addition, the ejection force made on the treats may not be adjusted either. So, the treats cannot be accurately shot to the desired location and attract the pet.

SUMMARY

The disclosure provides an object supplying assembly capable of achieving stable supply and output of objects.

The disclosure provides an object casting assembly capable of achieving stable output of objects through an impeller to cast the objects.

An object supplying assembly provided by the disclosure includes a storage tank, a rotating member, a driving module, and a partition board. The storage tank has a first space adapted to store a plurality of objects and a second space communicating with the first space. The rotating member is disposed in the second space and is adapted to rotate along an axis. The rotating member includes a recess recessed from an outer edge towards the axis, and the recess rotates around with the rotating member. The driving module drives the rotating member to rotate along the axis. The rotating member is located between the storage tank and the partition board, and the partition board includes a partition opening misaligned with the first space. When the recess of the rotating member rotates to a first position facing the first space, the opening of the recess communicates with the first space, and one of the plurality of the objects is able to enter the recess from the first space. When the recess of the rotating member turns around to a second position aligned with the partition opening of the partition board, the one of the plurality of objects located in the recess is allowed to drop and pass through the partition opening.

In an embodiment of the disclosure, the second space includes an internal region and an outer region communicating with each other. The internal region is aligned with the first space, the outer region is misaligned with the first space, and the partition opening corresponds to the outer region.

In an embodiment of the disclosure, the rotating member rotates along the axis so that the recess cyclically and alternatively passes through the internal region and the outer region. The object in the recess is able to enter the recess from the first space when the recess is located in the internal region, and the object in the recess is able to pass through the partition opening after being brought to the outer region by the rotating member.

In an embodiment of the disclosure, the object supplying assembly further includes a replaceable height-limiting member disposed in the storage tank. The height-limiting member is located at a side of the rotating member away from the partition board and is also located between the internal region and the outer region, and a passable height is defined by a distance between the partition board and the height-limiting member.

In an embodiment of the disclosure, the height-limiting member comprises an inclined structure, and the passable height is a distance between a lower end of the inclined structure and the partition board.

In an embodiment of the disclosure, the rotating member includes a conical top portion away from the partition board, and the object is adapted to slide into the recess along the conical top portion.

In an embodiment of the disclosure, wherein the conical top portion has a perturbation structure, and the perturbation structure is adapted to perturb the objects located in the first space when the rotating member rotates.

In an embodiment of the disclosure, the driving module includes a motor and a gear linked to the motor. The partition board is located between the gear and the rotating member, and the gear and the rotating member coaxially and synchronously rotate.

In an embodiment of the disclosure, the gear has a gear opening aligned with the recess and the partition opening of the partition board, and the object in the recess is allowed to drop and pass through the partition opening and the gear opening when the rotating member rotates to the second position.

In an embodiment of the disclosure, the driving module further comprises a reduction gear, the motor and the gear are linked through the reduction gear, and a number of teeth of the reduction gear is less than a number of teeth of the gear.

An object casting assembly provided by the disclosure includes a housing, an impeller, and a driver. The housing includes an internal space, a supply opening to receive an object and a casting opening, the supply opening and the casting opening communicating with the internal space. The impeller is located in the internal space and is rotatably disposed within the housing.

The impeller includes a plurality of blades, and a plurality of accommodating portions are formed among the blades within the impeller. One of the plurality of accommodating portions receive the object from the supply opening, and when the impeller rotates and the one of the accommodating portions faces the casting opening, the object in the one of the accommodating portions is casted out from the casting opening. The driver drives the impeller to rotate.

In an embodiment of the disclosure, the object casting assembly further includes a rotating module linked to the housing. The driver drives the impeller to rotate about a first axis, and the rotating module drives the housing to rotate about a second axis to adjust a direction that the casting opening faces.

An operation method of an object distribution system, including steps of: a control module of the object distribution system receiving an image capturing command; the control module of the object distribution system controlling a camera unit of the object distribution system to capture an image in response to the image capturing command; the control module transmitting the captured image to a personal device; the control module of the object distribution system receiving a target region in the captured image from the personal device; the control module of the object distribution system determining whether the target region is close or far to the object distribution system; and the control module of the object distribution system adjusting a casting speed of an object in an object casting assembly of the object distribution system.

In an embodiment of the disclosure, the object casting assembly of the object distribution system includes: a housing, including an internal space, a supply opening to receive an object and a casting opening, the supply opening and the casting opening communicating with the internal space, an impeller, located in the internal space, rotatably disposed within the housing, wherein the impeller including a plurality of blades, a plurality of accommodating portions are formed among the blades within the impeller, one of the plurality of accommodating portions receive the object from the supply opening, and when the impeller rotates and the one of the accommodating portions faces the casting opening, the object in the one of the accommodating portions is casted out from the casting opening; and a driver, driving the impeller to rotate.

In an embodiment of the disclosure, the object casting assembly of the object distribution system includes a rotating module linked to the housing, the driver drives the impeller to rotate about a first axis, and the rotating module drives the housing to rotate about a second axis to adjust a direction that the casting opening faces.

In an embodiment of the disclosure, the rotating module disposed on a bottom portion of the object distribution system is controlled by the control module, and the rotating module rotates the object distribution system or the camera unit.

In an embodiment of the disclosure, if the target region is close to the object distribution system, the control module controls the camera unit to zoom-in and the control module outputs a command to set a rotation speed of the impeller lower, if the target region is far to the object distribution system, the control module controls the camera unit to zoom-out and the control module outputs a command to set the rotation speed of the impeller faster.

In an embodiment of the disclosure, after the step of the control module of the object distribution system receives the target region in the captured image from the personal device, the control module controls the camera unit to adjust a focal length of the camera unit, and the control module receives the captured image from the camera unit and post-processes the captured image to enlarge a partial image of the target region.

In an embodiment of the disclosure, the control module of the object distribution system controls the object casting assembly to cast the object in the object casting assembly in response to a casting command from the personal device or according to casting settings of the object distribution system.

To sum up, in the object supplying assembly provided by the disclosure, the recess of the rotating member rotates along with the rotating member and faces the first space storing the objects, and the partition opening is misaligned with the first space. In this way, when the recess of the rotating member rotates to the position facing the first space, the objects are adapted to enter the recess from the first space. When the recess of the rotating member rotates to the position aligned with the partition opening, the object located in the recess is adapted to pass through the partition opening. In this way, the rotating member may transport the objects to the partition opening in sequence, and stable output of the objects is thus achieved. In addition, in the object casting assembly provided by the disclosure, the plurality of accommodating portions adapted to accommodate the objects are formed among the blades of the impeller. When the impeller rotates, the accommodating portions face the casting opening by turns, such that the objects located in the accommodating portions are adapted to be casted from the casting opening in sequence. In this way, the object casting assembly may throw the objects in sequence, and stable throwing of the objects is therefore achieved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
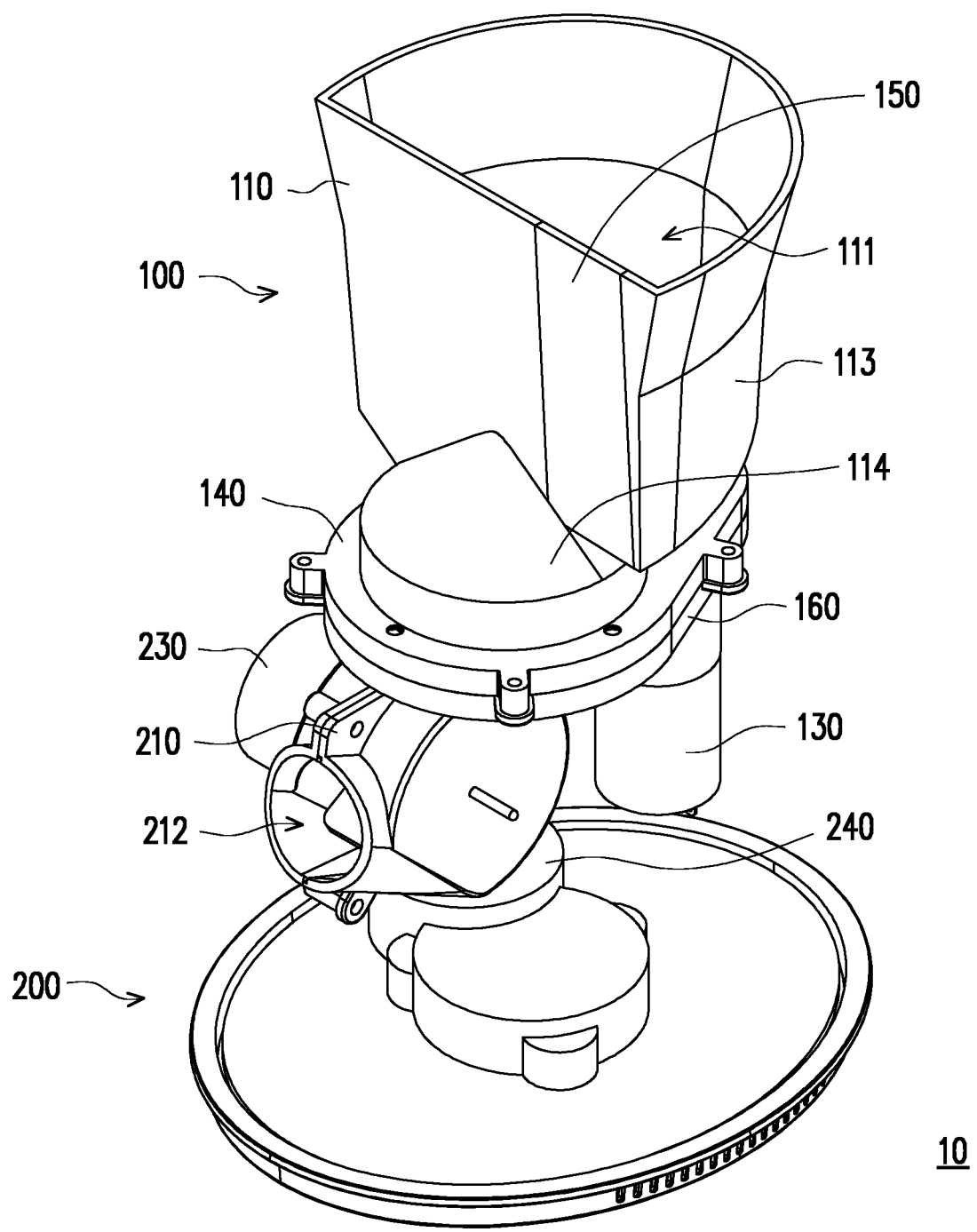
FIG. 1 is a three-dimensional view of an object distribution system according to an embodiment of the disclosure.

FIG. 1 is a three-dimensional view of an object distribution system according to an embodiment of the disclosure. With reference to FIG. 1, an object distribution system 10 provided by an embodiment of the present disclosure includes an object supplying assembly 100 and an object casting assembly 200. In an embodiment, the object supplying assembly 100 is disposed above the object casting assembly 200, and the object supplying assembly 100 is adapted to store a plurality of objects T (FIG. 7A to FIG. 7C) and output these objects T to the object casting assembly 200 one by one. The object casting assembly 200 is configured to cast the object T in stable trajectory, so the objects T supplied by the object supplying assembly 100 can be sequentially casted to the desired locations one by one. In some embodiments of the disclosure, the objects T are pet treats, and the object distribution system 10 is a treat dispensing system, which should however not be construed as a limitation to the disclosure. Description thereof is provided as follows.

Figure 2:
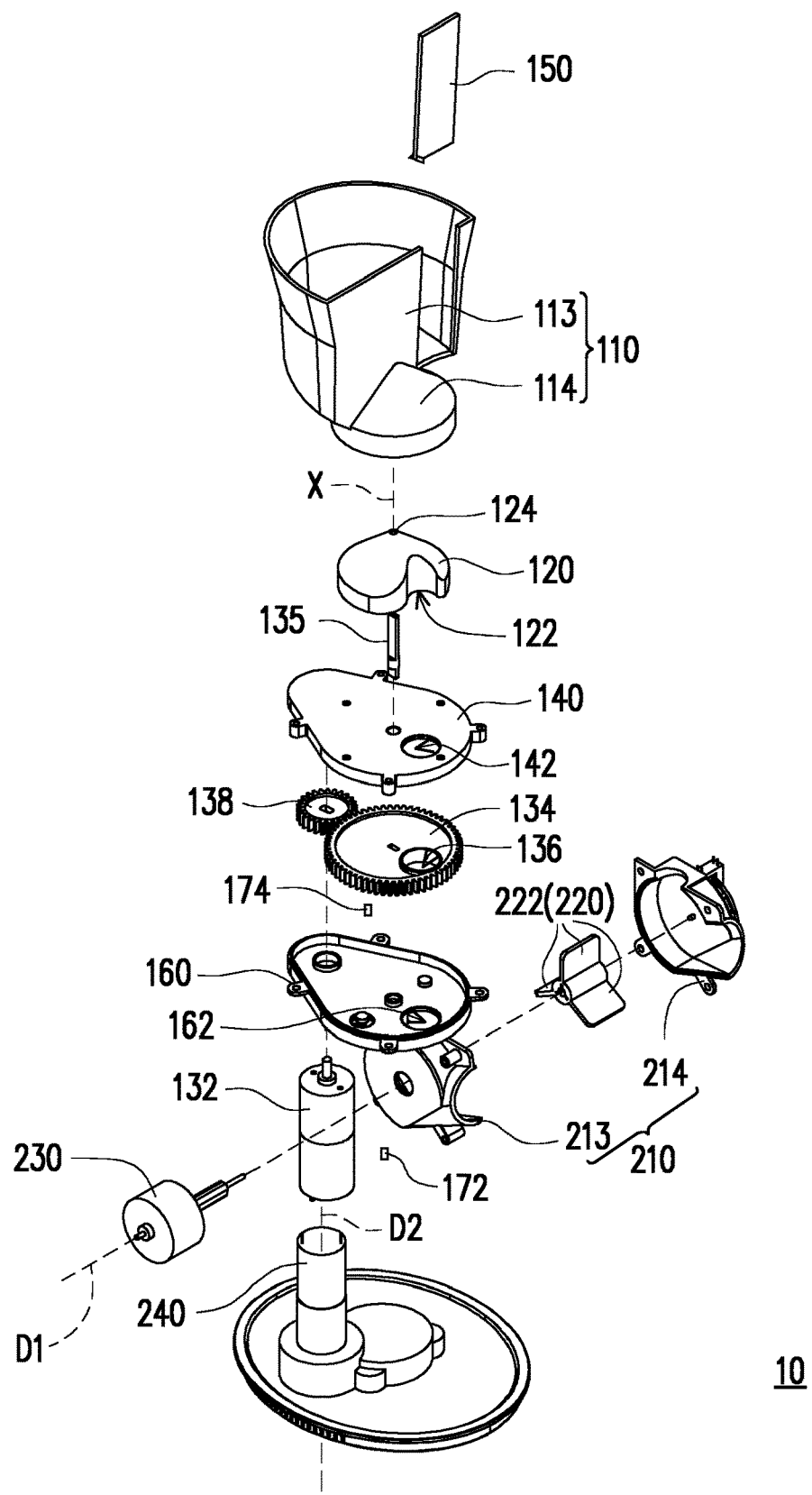
FIG. 2 is an exploded schematic view of the object distribution system in FIG. 1.
Figure 3A:
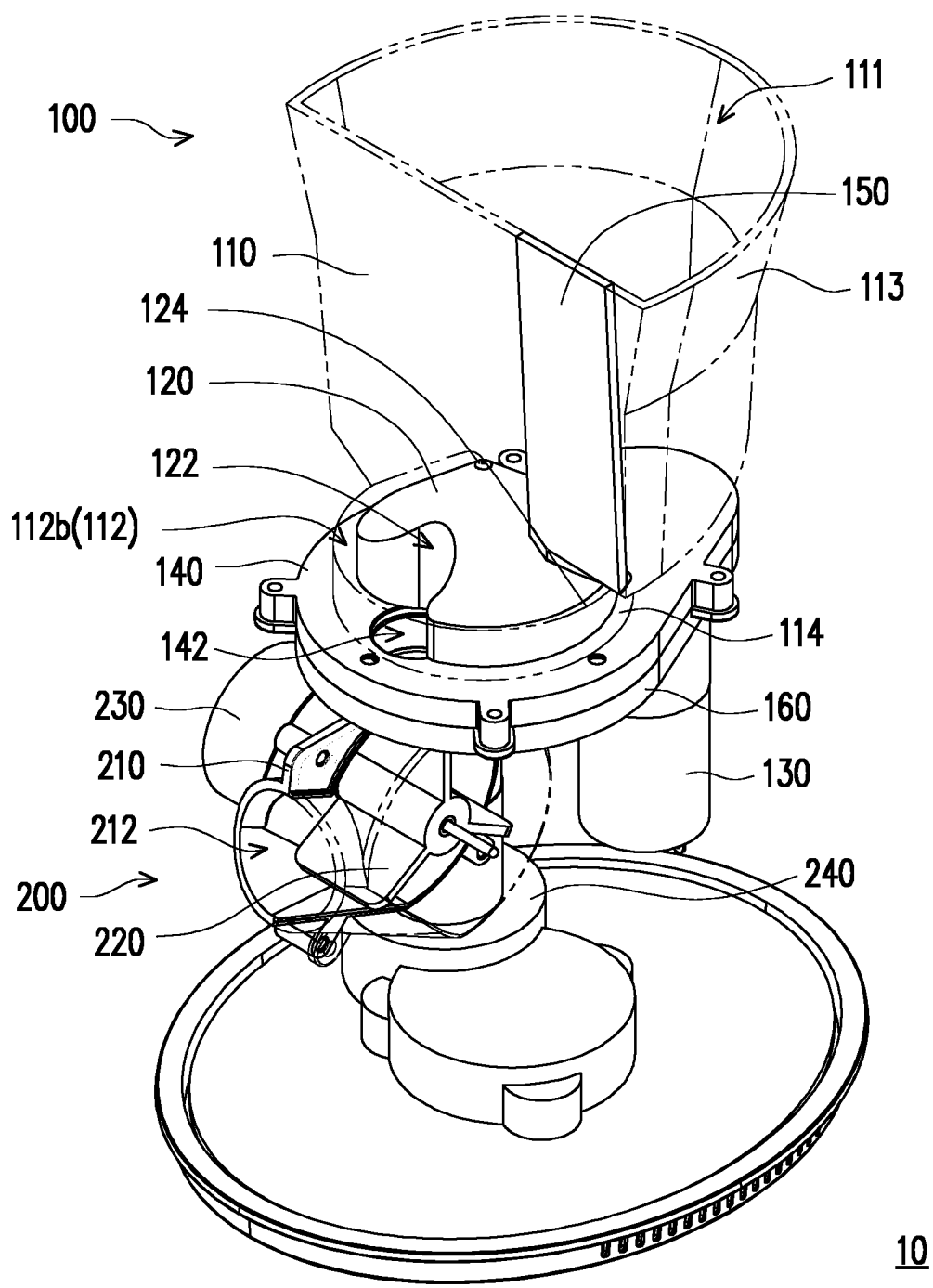
FIG. 3A is a perspective three-dimensional view of a portion of the object distribution system of FIG. 1.
Figure 3B:
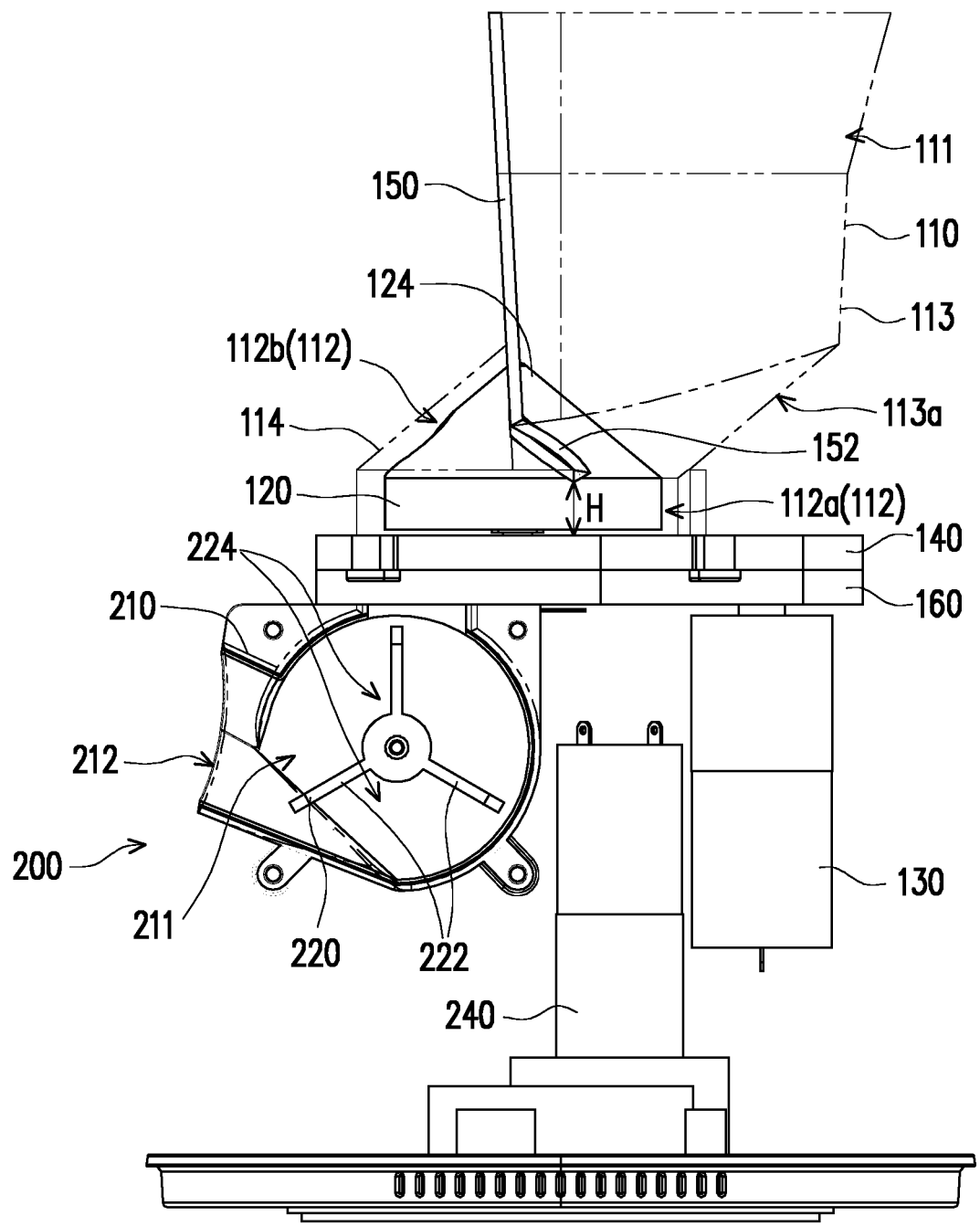
FIG. 3B is a side view of FIG. 3A.
Figure 4A:
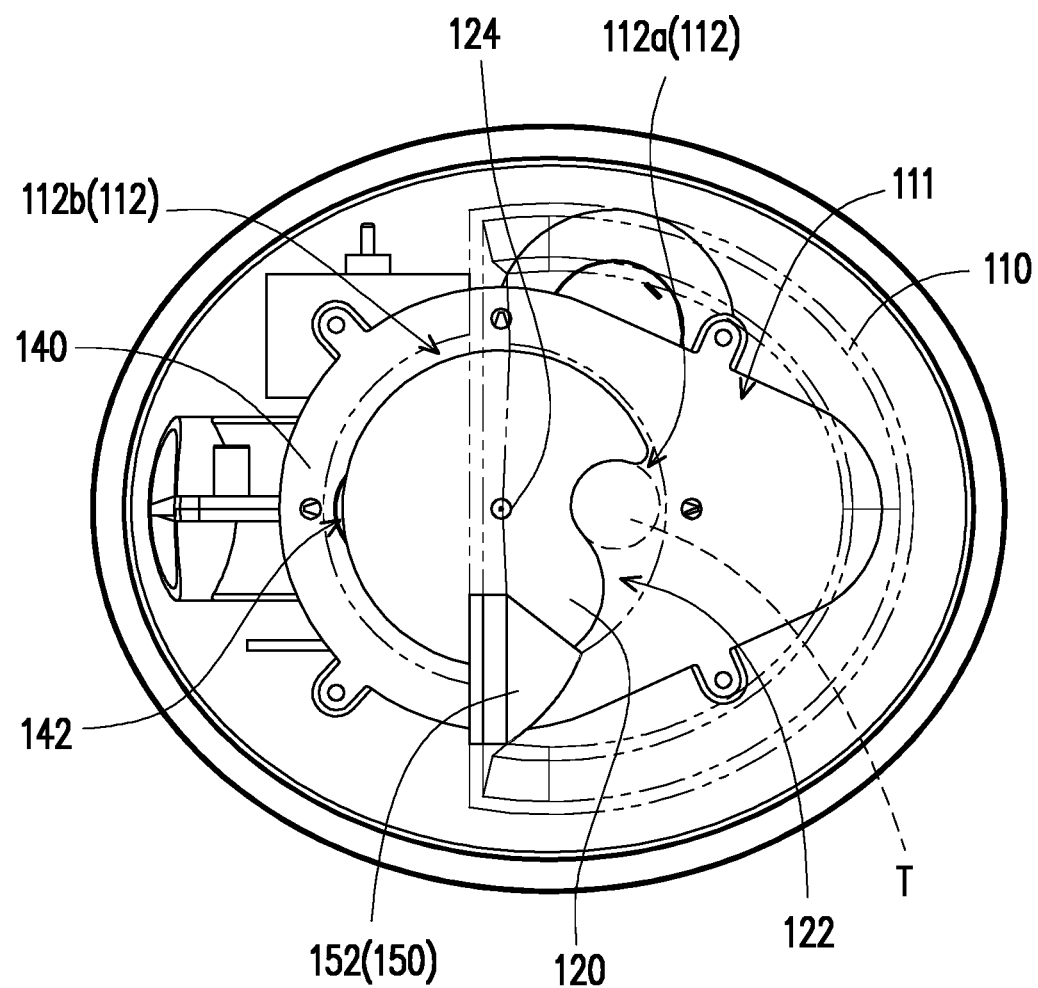
FIG. 4A is a schematic view of an object supplying assembly of FIG. 1 in operation.
Figure 4B:
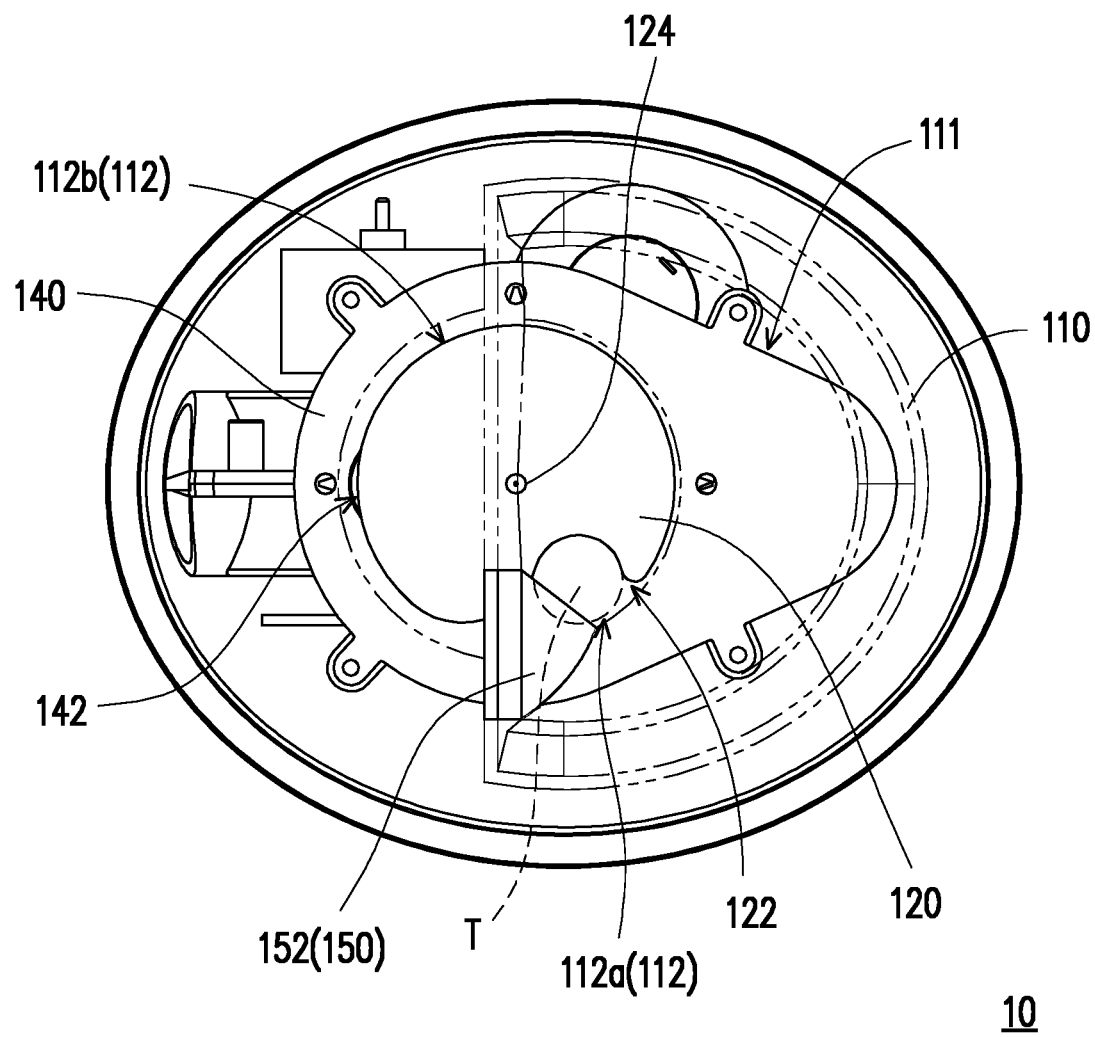
FIG. 4B is another schematic view of the object supplying assembly of FIG. 1 in operation.
Figure 4C:
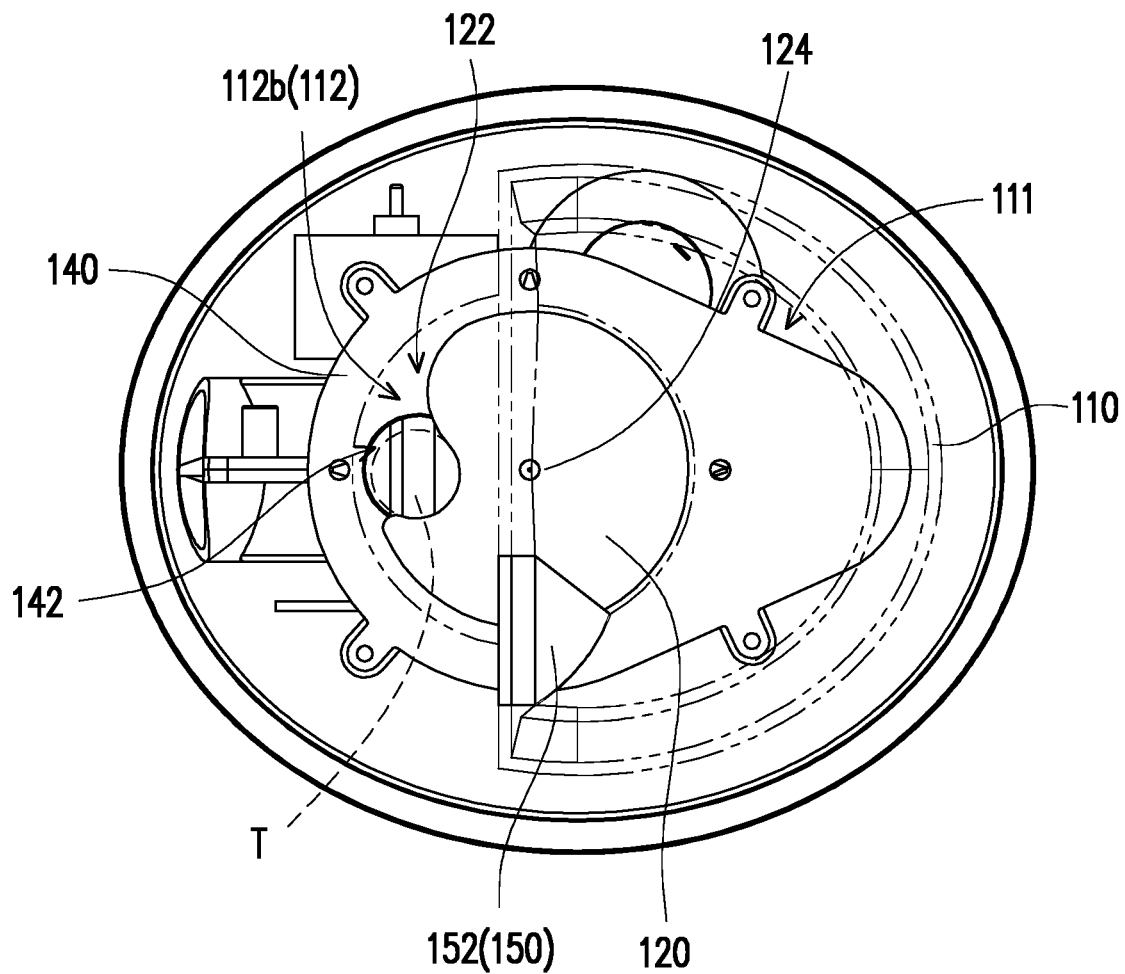
FIG. 4C is another schematic view of the object supplying assembly of FIG. 1 in operation.

FIG. 2 is an exploded schematic view of the object distribution system in FIG. 1. FIG. 3A is a perspective three-dimensional view of a portion of the object distribution system of FIG. 1. FIG. 3B is a side view of FIG. 3A. FIG. 4A is a schematic view of an object supplying assembly of FIG. 1 in operation. FIG. 4B is another schematic view of the object supplying assembly of FIG. 1 in operation. FIG. 4C is another schematic view of the object supplying assembly of FIG. 1 in operation.

With reference to FIG. 1 to FIG. 4C, the object supplying assembly 100 includes a storage tank 110, a rotating member 120 (FIG. 2), a driving module 130, and a partition board 140. In FIG. 3A to FIG. 4C, in order to clearly present internal elements of the object supplying assembly 100, the storage tank 110 is illustrated with dotted lines, and positions of the objects T are schematically shown in dotted lines as well in FIG. 4A to FIG. 4C.

The storage tank 110 includes a first outer housing 113 and a second outer housing 114 connected to the first outer housing 113. The first outer housing 113 forms a first space 111 adapted to store the objects T, and the second outer housing 114 forms the second space 112 communicating with the first space 111. As shown in FIG. 3B, the second space 112 includes an internal region 112a and an outer region 112b communicating with each other. The internal region 112a is aligned with the first space 111 and is located right below the first space 111. The outer region 12b is misaligned with the first space 111 and is not located right below the first space 111.

In an embodiment, the first outer housing 113 includes a guiding surface 113a (as shown in FIG. 3B), and the guiding surface 113a is located at a bottom portion of the first outer housing 113, such that the objects T in the first space 111 are guided to slide down to the second space 112 along the guiding surface 113a. When being guided by the guiding surface 113a, the objects T move towards the second space 112, so that the objects T are prevented from being stuck in a corner of the first outer housing 113 and causing no output of the objects T.

With reference to FIG. 2 and FIG. 3B, the rotating member 120 is disposed in the second space 112 and is adapted to be driven by the driving module 130 to rotate along an axis X (FIG. 2). In an embodiment, the rotating member 120 is conical and includes a recess 122 recessed from an outer edge towards the axis X and a conical top portion 124 away from the partition board 140. The objects T are adapted to slide into the recess 122 along the conical top portion 124.

Figure 6:
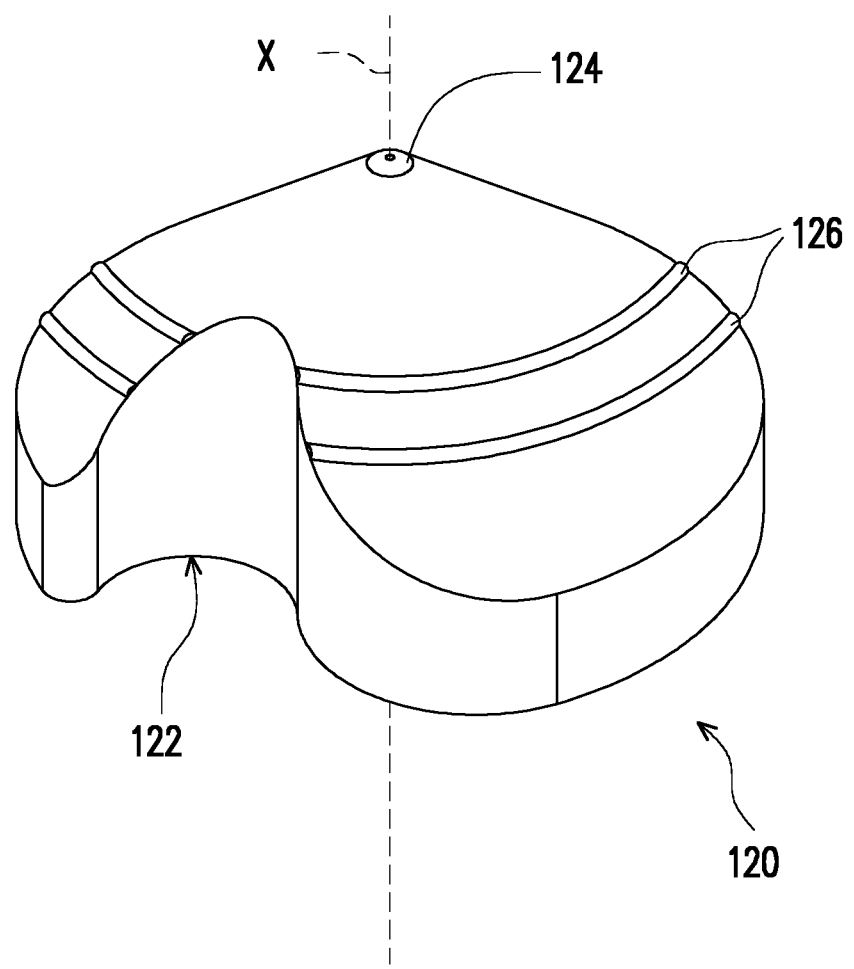
FIG. 6 is a three-dimensional view of a rotating member according to another embodiment of the disclosure.

FIG. 6 is a three-dimensional view of a rotating member according to another embodiment of the disclosure. With reference to FIG. 6, the conical top portion 124 has a perturbation structure 126. When the rotating member 120 rotates, the perturbation structure 126 is adapted to perturb the objects T located in the first space 111, so that the objects T are uniformly distributed in the first space 111 and thus are prevented from being stuck in a partial region of the first space 111 and causing no output of the objects T.

In an embodiment, the perturbation structure 126 is, for example, a plurality of reliefs. The reliefs are spiral shaped and disposed on an outer periphery or a surface of the conical top portion 124 around the axis X, which can provide better perturbation effect on the objects T stored in the in the first space 111 when the rotating member 120 rotates. Nevertheless, the disclosure is not limited thereto, and in other embodiments, the perturbation structure 126 may have other shapes. Besides, even in the case where the perturbation structure 126 is not formed on the conical top portion 124, the rotating member 120 may still generate certain perturbation effect on the objects T in the first space 111 when rotating.

In an embodiment, an inner contour of the second outer housing 114 corresponds to an outer contour of the rotating member 120, such that the rotating member 120 almost occupies the second space 112 formed in the second outer housing 114, and only the recess 122 of the rotating member 120 retains an opening that can accept an object T. In particular, at the area boundary between the internal region 112a and the outer region 112b, there is only a significantly small gap between the rotating member 120 and the second outer housing 114. Therefore, the objects T in the first space 111 cannot pass through the small gap and enter into the outer region 112b.

The partition board 140 is disposed at a bottom portion of the rotating member 120, such that the rotating member 120 is located between the storage tank 110 and the partition board 140. As shown in FIG. 3A, the partition board 140 includes a partition opening 142 misaligned with the first space 111, and the partition opening 142 corresponds to the outer region 112b.

With reference to FIG. 4A to FIG. 4C, the recess 122 turns around as the rotating member 120 rotates, which makes the recess 122 face the first space 111 or away from the first space 111. That is, when the rotating member 120 rotates, the recess 122 cyclically and alternatively passes through the internal region 112a and the outer region 112b. When being rotated to the internal region 112a, the recess 122 faces the first space 111. As shown in FIG. 4A, when the recess 122 of the rotating member 120 rotates to a position facing the first space 111, the opening of the recess 122 communicates with the first space 111. At this time, an object T among the objects T is able to enter the recess 122, which is currently located at the internal region 112a, from the first space 111.

As the rotating member 120 rotates, the object T in the recess 122 is brought by the rotating member 120 and turns around with the recess 122.

As shown in FIG. 4B, the recess 122 of the rotating member 120 turns around from the inner region 112a to the outer region 112b. At the same time, the object T in the recess 122 is brought to the outer region 112b by the rotating member 120. As shown in FIG. 3A and FIG. 4C, when the recess 122 of the rotating member 120 turns around to a position aligned with the partition opening 142 of the partition board 140, the object T located in the recess 122 is allowed to drop and pass through the partition opening 142.

As described above, the recess 122 of the rotating member 120 can transport the objects T from the first space 111 to the partition opening 142 one by one sequentially, and the stable output of the objects T from the object supplying assembly 100 is thus achieved. In an embodiment, the object supplying assembly 100 outputs only one object T at a time to the object casting assembly 200, which should however not be construed as limitations to the disclosure. The size of the recess 122 can be designed to accept multiple objects T and transport them to the partition opening 142 at a time.

Figure 5:
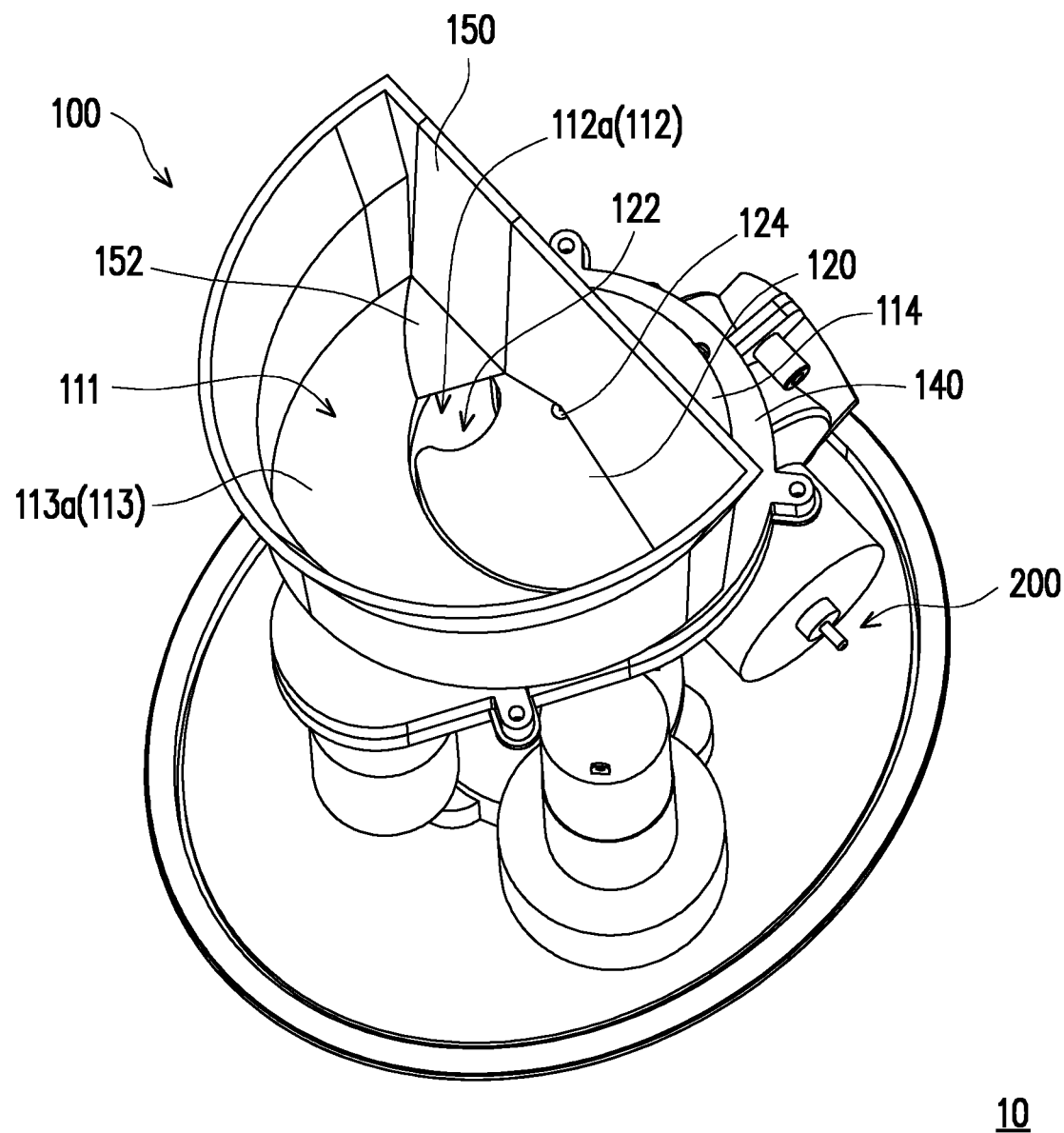
FIG. 5 is a three-dimensional view of the object supplying assembly from another viewing angle, where the object supplying assembly is in a state of FIG. 4B.

FIG. 5 is a three-dimensional view of the object supplying assembly 100 from another viewing angle, wherein the object supplying assembly 100 is in a state as FIG. 4B. With reference to FIG. 3B, FIG. 4B, and FIG. 5, the object supplying assembly 100 further includes a replaceable height-limiting member 150 disposed in the storage tank 110. The height-limiting member 150 is located at a side of the rotating member 120 away from the partition board 140 and is also located between the internal region 112a and the outer region 112b. A passable height H (FIG. 3B) is defined by the distance between partition board 140 and the height-limiting member 150. In an embodiment, the passable height H is slightly longer than the width and length of one object T, such that each time only one object T is allowed to pass under the height-limiting member 150, which should however not be construed as limitations to the disclosure.

When the recess 122 of the rotating member 120 is rotated from the internal region 112a to the outer region 112b, the recess 122 passes under the height-limiting member 150 (FIG. 4B), and the objects T in the first space 111 are perturbed. As the objects T drop or slide down, some of the objects T may enter the recess 122. If more than one object T is piled in the recess 122, the height of the piled objects T is higher than the passable height H, so the objects T piled above the rotating member 120 will be blocked by the height-limiting member 150 and cannot pass through under the height-limiting member 150. In this way, only one object T is allowed to pass under the height-limiting member 150 and enter the outer region 112b at a time. Therefore, the object supplying assembly 100 outputs only one object T at a time to the object casting assembly 200. Moreover, the foreign object accidentally entered to the first space 111 may also be screened or filtered by the height-limiting member 150.

In an embodiment, the object supplying assembly can be applied to various objects T with different sizes. The height-limiting members 150 may be replaced to change the passable height H between the partition board 140 and the height-limiting member 150 in order to match the selected objects T. In this way, through replacement of the height-limiting member 150, it is ensured that the passable height H always matches the size of any objects T applied to the object supplying assembly and only one object T is allowed to pass through each time. Therefore, the object supplying assembly 100 of the embodiment can be applied to objects T of various sizes, and the effect of supplying objects T one by one in sequence can be achieved.

In an embodiment, with reference to FIG. 3B and FIG. 5, the height-limiting member 150 may be slidably disposed on a side wall of the first outer housing 113 and the height-limiting member 150 includes an inclined structure 152. The inclined structure 152 is located at a lower portion of the height-limiting member 150, and the passable height H is defined by a distance between a lower end of the inclined structure 152 and the partition board 140. The inclined structure 152 has an inclined surface extending inwards from the side wall of the first outer housing 113, and the inclined structure 152 is located beside or opposite to the guiding surface 113a (FIG. 5).

In addition, in an embodiment, with reference to FIG. 2, the driving module 130 includes a motor 132 and a gear 134 linked to the motor 132. The motor 132 and the gear 134 are linked through a reduction gear 138, and the number of teeth of the reduction gear 138 is less than the number of teeth of the gear 134. The partition board 140 is located between the gear 134 and the rotating member 120, and the gear 134 links the rotating member 120 with a rotating shaft 135 passing through the partition board 140, such that the gear 134 and the rotating member 120 coaxially and synchronously rotate.

In an embodiment, the gear 134 has a gear opening 136 (FIG. 2) aligned with the recess 122, which should however not be construed as limitations to the disclosure. In other embodiments, the gear 134 may be disposed in a manner without blocking the partition opening 142, and the gear opening 136 may thus be omitted from the gear 134.

In an embodiment, with reference to FIG. 2, the object supplying assembly 100 further includes a bottom housing 160 disposed on a bottom portion of the storage tank 110 and connected to the object casting assembly 200. The rotating member 120 and the partition board 140 are located between the storage tank 110 and the bottom housing 160, and the bottom housing 160 has a bottom housing opening 162 aligned with the partition opening 142 of the partition board 140. In an embodiment, the gear 134 is disposed between the partition board 140 and the bottom housing 160, and the gear opening 136 is aligned with the partition opening 142 of the partition board 140 and the bottom housing opening 162 of the bottom housing 160.

As shown in FIG. 2, FIG. 3A, and FIG. 4C, when the rotating member 120 rotates to the position that the recess 122 is aligned with the partition opening 142 of the partition board 140, the gear 134 is also rotated to the position that the gear opening 136 is aligned with the partition opening 142 since the gear 134 and the rotating member 120 coaxially and synchronously are rotated. Therefore, the object T in the recess 122 is allowed to drop and pass through the partition opening 142, the gear opening 136, and the bottom housing opening 162 in sequence at the moment. In this way, the object T is supplied to the object casting assembly 200.

In an embodiment, with reference to FIG. 2, the object supplying assembly 100 further includes a Hall element 172 and a magnet 174. In an embodiment, the Hall element 172 is disposed on the bottom housing 160, and the magnet 174 is disposed on the gear 134. The Hall element 172 is configured to sense the magnet 174 so as to obtain the position of the gear opening 136 of the gear 134, which is corresponding to the position of the recess 122 of the rotating member 120 However, this not be construed as limitations to the disclosure. In some embodiments, the Hall element 172 may be disposed on the partition board 140, and the magnet 174 may be disposed on the rotating member 120 correspondingly. Through the sensed position information provided by the Hall element 172, the accuracy of controlling the object supplying assembly 100 may be improved.

Further, with reference to FIG. 1 to FIG. 3, the object casting assembly 200 includes a housing 210, an impeller 220, and a driver 230. The housing 210 is formed by a first housing 213 (FIG. 2) and a second housing 214 (FIG. 2). The first housing 213 and the second housing 214 form an internal space 211 (FIG. 3) a supply opening to receive an object and a casting opening 212, the supply opening and the casting opening 212 communicating with the internal space 211. In FIG. 3A and FIG. 3B, in order to clearly present internal elements of the object casting assembly 200, the second housing 214 is illustrated with dotted lines.

With reference to FIG. 2 to FIG. 3B, the impeller 220 located in the internal space 211 is rotatably disposed within the housing 210, and the driver 230 drives the impeller 220 to rotate about a first axis D1 (FIG. 2). The impeller 220 includes a plurality of blades 222, wherein a plurality of accommodating portions 224 (FIG. 3B) are formed among the blades 222 within the impeller 220. In an embodiment, there are three blades 222 in the impeller 220 forming three accommodating portions 224, which should however not be construed as limitations to the disclosure.

Figure 7A:
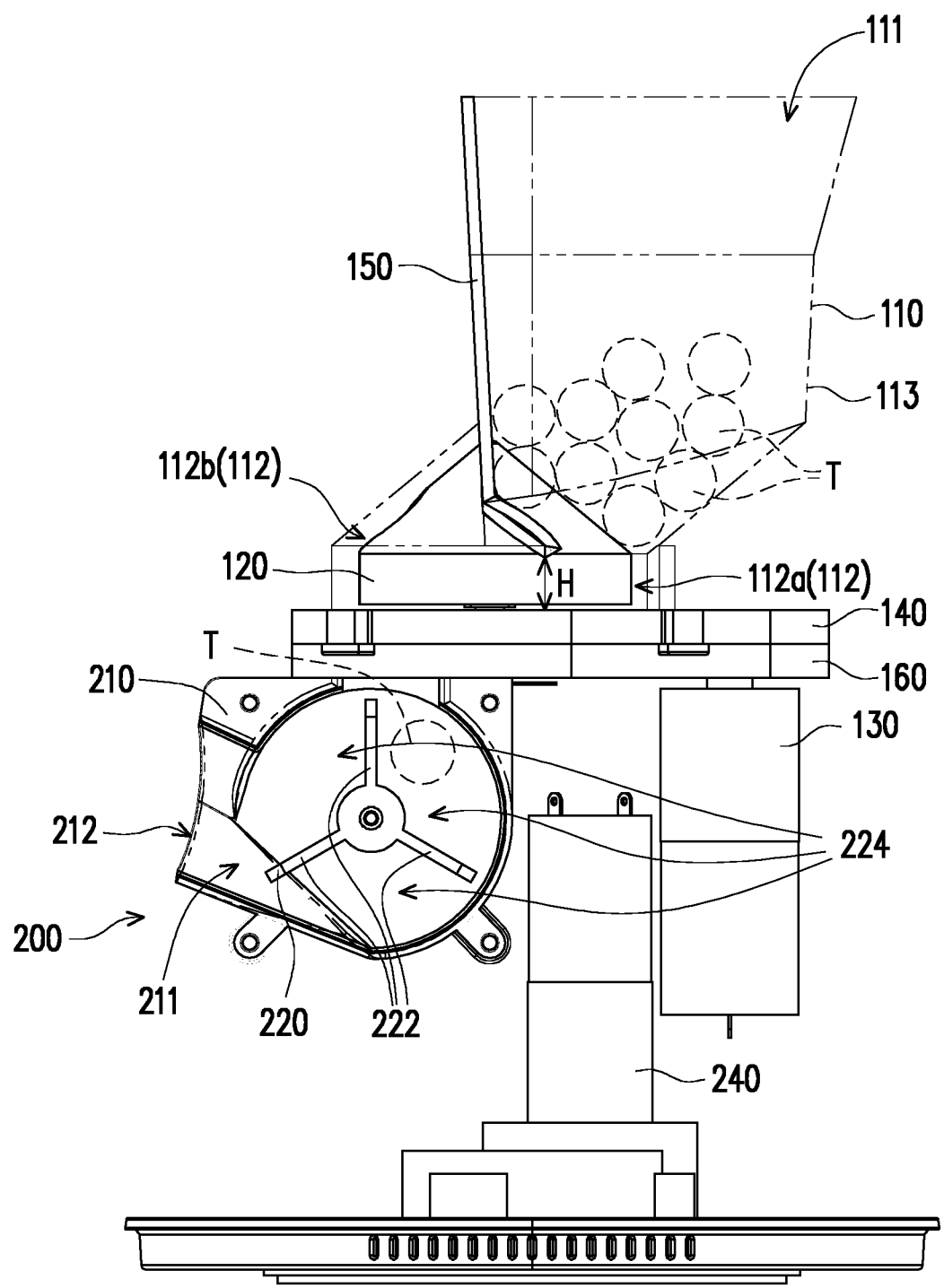
FIG. 7A is a schematic view of an object casting assembly of FIG. 1 in operation.
Figure 7B:
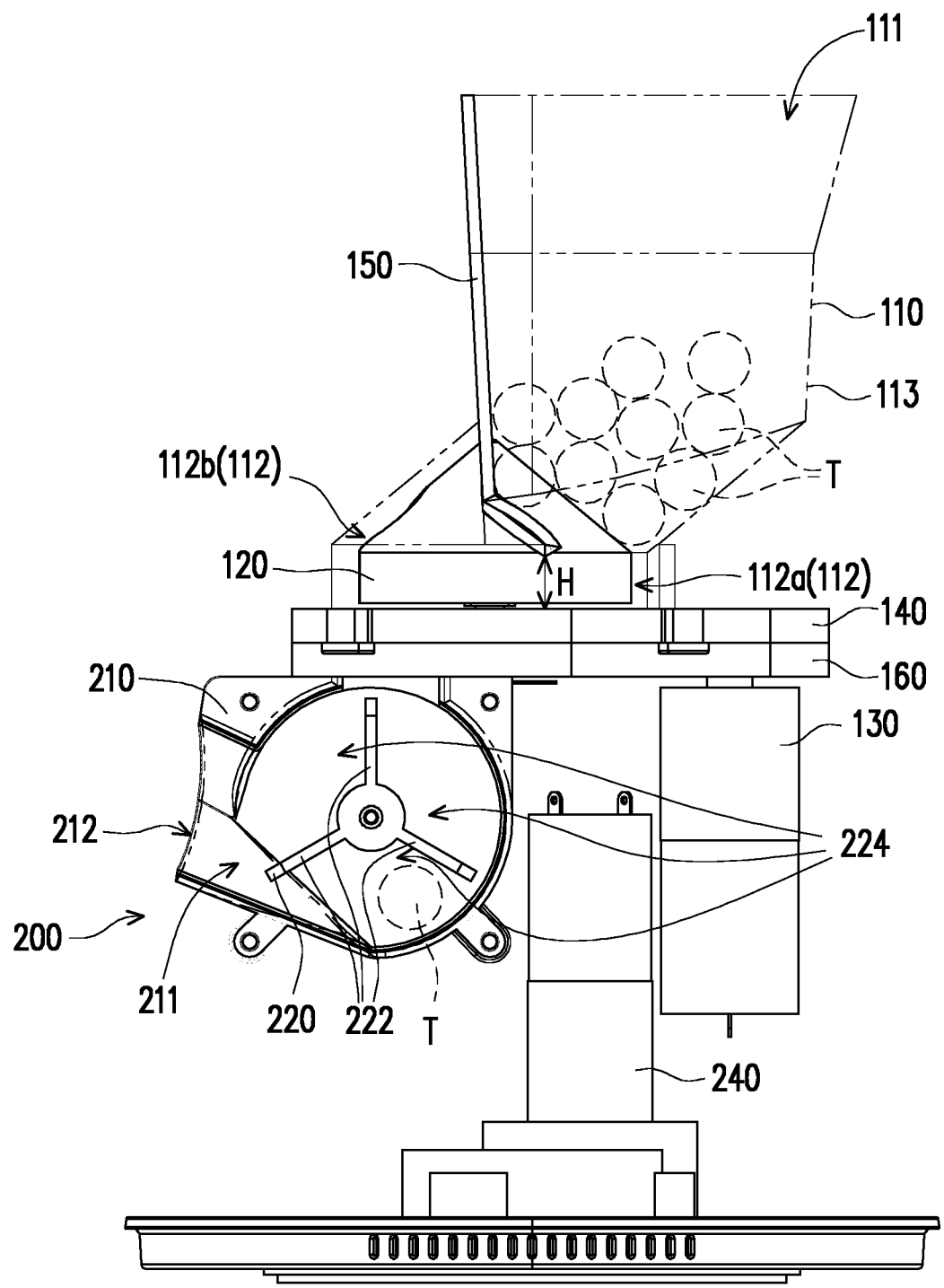
FIG. 7B is a schematic view of the object casting assembly of FIG. 1 in operation.
Figure 7C:
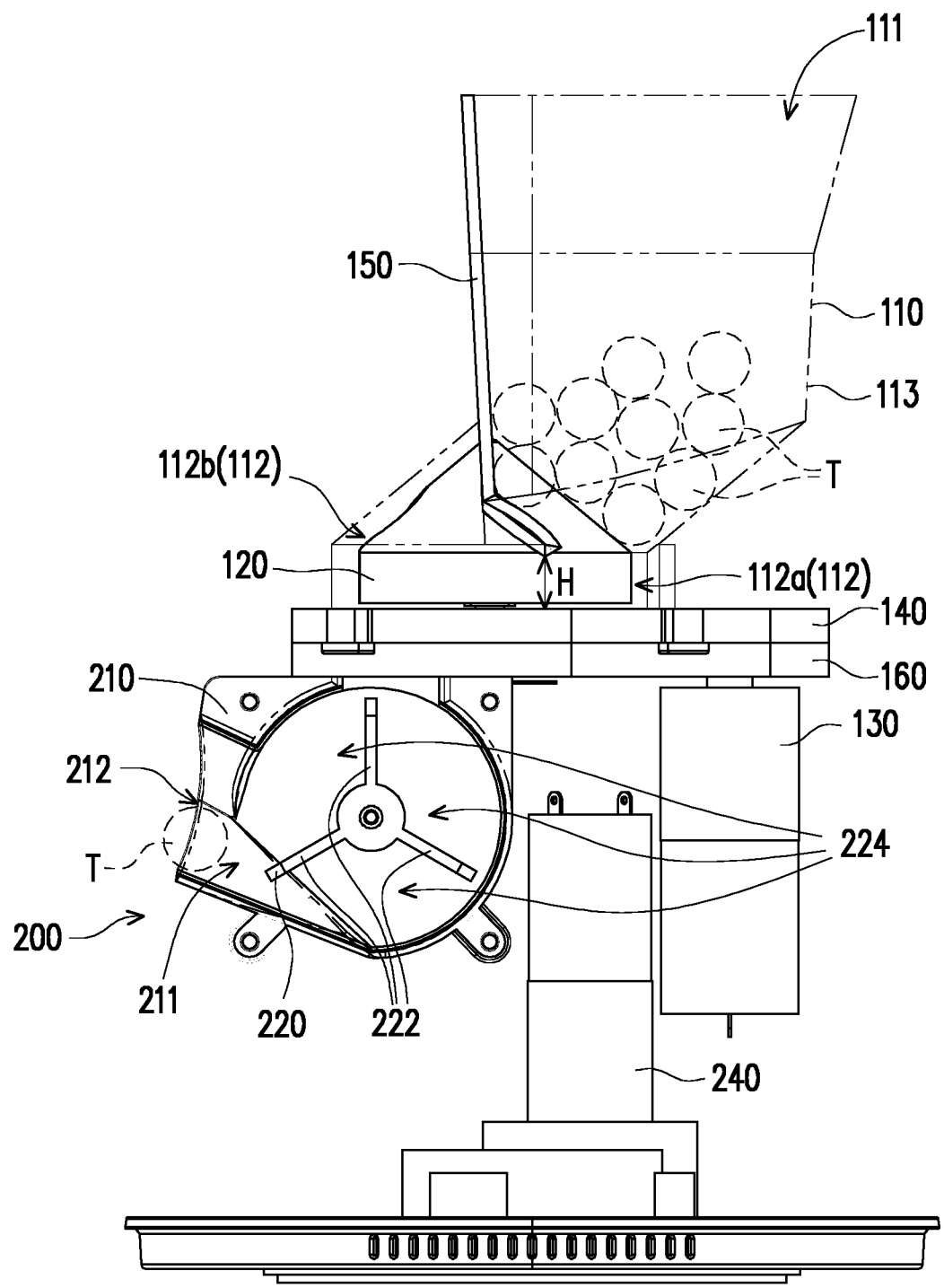
FIG. 7C is a schematic view of the object casting assembly of FIG. 1 in operation.

FIG. 7A is a schematic view of the object casting assembly of FIG. 1 in operation. FIG. 7B is a schematic view of the object casting assembly of FIG. 1 in operation. FIG. 7C is a schematic view of the object casting assembly of FIG. 1 in operation. In FIG. 7A to FIG. 7C, in order to clearly present the internal elements of the object supplying assembly 100 and the object casting assembly 200, the storage tank 110 and the second housing 214 are illustrated with dotted lines, and the positions of the objects T are schematically shown in dotted lines as well.

In an embodiment, with reference to FIG. 7A to FIG. 7C, when the impeller 220 rotates, the accommodating portions 224 face the casting opening 212 by turns. To be specific, as shown in FIG. 7A, the objects T separately enter one of the accommodating portions 224 from the object supplying assembly 100 in sequence. As shown in FIG. 7B, when the impeller 220 rotates, the blade 222 pushes the object T located in the accommodating portion 224 to rotate around. As shown in FIG. 7C, when the opening of the accommodating portion 224 having an object T within faces the casting opening 212, the object T pushed by the blade 222 is casted out from the casting opening 212. The object T will fly in the air toward the direction that the casting opening 212 faces, and the rotation speed of the impeller 220 determines the force that the blade 22 pushes the object T within the accommodating portion 224 out.

In an embodiment, one accommodating portion 224 is limited to accommodate one object T. Therefore, when the accommodating portions 224 face the casting opening 212 by turns, the objects T located in these accommodating portions 224 are individually casted out from the casting opening 212 in sequence. In addition, the blades 222 can stably apply controllable forces to the objects T rotated around with the accommodating portions 224. The trajectory of the casted objects T is therefore stably controllable, such that the objects T can be accurately casted out to the desired location or desired distance.

In an embodiment, the object casting assembly 200 further includes a rotating module 240 disposed below the housing 210 and linked to the housing 210. The rotating module 240 drives the housing 210 to rotate about a second axis D2 (FIG. 2) to adjust the direction that the casting opening 212 faces, and the second axis D2 is perpendicular to the first axis D1. With the rotating module 240, the object distribution system 10 can freely turn to any direction and cast the object T toward.

In an embodiment, the object distribution system 10 further includes a control module and a camera, which are not illustrated in the figures. The control module controls the camera, the object supplying assembly 100 and object casting assembly 200 of the object distribution system and can remotely connects to a personal device of a user, such as a pet owner. The pet owner may control the object distribution system 10 with a personal device, for example, a remote control device of a smart phone, connected with the control module of the object distribution system 10. The personal device can be installed with application software that communicates with the control module of the object distribution system 10 for exchanging information and control commands.

In an embodiment, the user can control the camera of the object distribution system 10 through the control module remotely. For example, a pet's activities in home can be recorded by the camera of the object distribution system 10, which is controlled by the pet owner, and the images of the pet's activities are sent to the pet owner's personal device in real time, such that the pet owner can thereby watch the pet's activities on the personal device at any time even he/she is away from home. In addition, the interaction between the remote user and the pet can be realized by the combination of the camera providing the real-time images of the pet and object distribution system 10 having the object supplying assembly 100 and object casting assembly 200. Description thereof is provided as follows.

Figure 8:
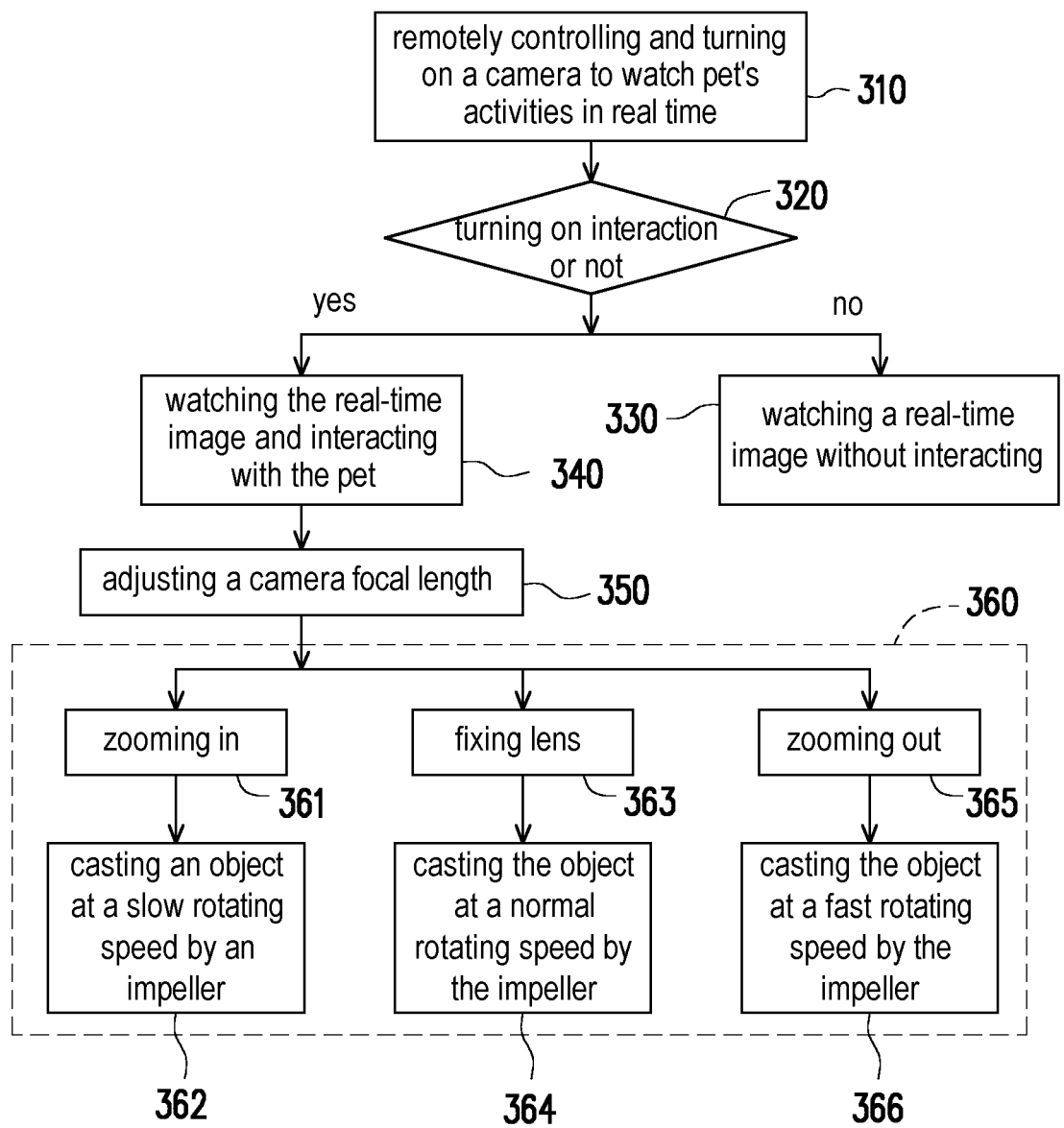
FIG. 8 is a flow chart of an operation process of the object distribution system of FIG. 1.

FIG. 8 is a flow chart of an operation process of the object distribution system of FIG. 1 which receives the remote user's control commands. With reference to FIG. 8, in step 310, firstly a user remotely connects to the personal device to the object distribution system 10 and controls the camera of the object distribution system 10 to capture images of a creature's or an object's activities in real time. The real-time images captured by the camera are transmitted to the personal device of the user in real time so the user can watch the creature's or the object's real-time activities. In step 320, the object distribution system determines whether the user activates the interactive mode in order to interact with the creature or the object. The user can operate the object distribution system or use the personal device to activate the interaction mode of the object distribution system, and the control module of the object distribution system determines whether the command of activating the interaction mode is received. In an embodiment, the user can operate the application installed on the personal device to remotely activate the interaction mode of the object distribution system, or the application installed on the personal device can remind or ask the user whether to activate the interaction mode of the object distribution system. If it is determined the user does not activate the interaction mode, step 330 is performed, and the camera continues recording the creature's or object's activities. The user can watch a real-time image on the personal device without interacting with the creature or object. If it is determined the user activates the interaction mode, step 340 is performed, and the user can watch the real-time image of from the camera of the object distribution system and control the object distribution system to interact with the creature or object.

Steps from step 350 are performed when the user operates the personal device to control the object distribution system to interact with the creature or object. In step 350, the user can operate the personal device to select a target region, such as the creature's or object's current location, and the control module controls the camera to photograph the target region and adjust the focal length of the camera. The control module may receive the captured images from the camera and post-process the captured images to enlarge the partial image of the target region. In an embodiment, the rotating module 240 disposed on a bottom portion of the object distribution system 10 is controlled by the control module, and the rotating module 240 rotates the entire object distribution system 10 or the camera such that the camera can face the region selected by the user. That is, the rotating module 240 can synchronously adjust the direction of the casting opening 212 and the image-capturing direction of the camera based on the operations made by the user. In an embodiment, the user can see the camera being rotated and the focal length is adjusted to zoom-in or zoom-out on the personal device after the user selects the target region. That is, the control module of the object distribution system 10 controls the object casting assembly 200 to cast the object in the object casting assembly 200 in response to a casting command from the personal device or according to casting settings of the object distribution system 10.

In step 360, the control module of the object distribution system determines whether the target region is close or far to the object distribution system. If it is determined that target region is close, for example, the estimated distance between the target region, such as the location of the creature or object, and the object distribution system 10 is less than a predetermined value, the control module controls the camera to zoom-in (step 361), such that the camera's focal length is increased. In an embodiment, the control module also outputs a command to set the rotation speed of the impeller 220 lower, so the object T is casted out at a slower speed (step 362). That is, the object T is casted out by a smaller force, which makes the cast range of the object T is shorter. If it is determined that the target region is not close or far to the object distribution system, for example, the distance between the target location and the object distribution system 10 is approximate to the predetermined distance, the control module controls the camera to fix the lens without adjusting the focal length (step 363). In an embodiment, the control module also outputs a command to set the rotation speed of the impeller 220 to normal, so the object T is casted out at a normal speed (step 364). If it is determined that the target region is far to the object distribution system, for example, the distance between the target region and the object distribution system 10 is greater than the predetermined distance, the control module controls the camera to zooms out (step 365), such that the camera's focal length is reduced. In an embodiment, the control module also outputs a command to set the rotation speed of the impeller 220 to faster, so the object T is casted out at a faster speed (step 366). That is, the object T is casted out by a stronger force, which makes the cast range of the object T is farer.

Based on the descriptions above, after the object supplying assembly 100 outputs the objects T to the object casting assembly 200 one by one in sequence, the impeller 220 of the object casting assembly 200 can cast the objects T at various rotating speeds according to the commands provided by the control module. In this way, the casting trajectory and range of the objects T can be stably controlled, such that the objects T may be accurately casted to the pet or the targeted location, and good interaction between the pet owner and the pet is thereby achieved.

In an embodiment, the object distribution system 10 may be set by the user to automatically cast out objects T at regular time intervals or at a predetermined time, so the user does not need to operate the personal device to output remote control commands to the object distribution system 10 frequently. Moreover, the object distribution system 10 may detect whether any movement of creature or object such as the pet within a specific range based on the captured images of the camera or other detected signals from sensors. If no movement has been found within a specific period of time, the object distribution system 10 can automatically send a notice or alert to the personal device of the user, so the user can be actively notified. Besides, the control module of the object distribution system 10 may determine a physical condition of the creature or object through the captured image from the camera. For example, if the control module determines that the pet is hungry, the control module of the object distribution system 10 may actively send message to notify the user and allow the user to decide whether to feed the pet. In an embodiment, the user can also operation the personal device to set the object distribution system 10 to automatically cast the object T out if the object distribution system 10 determines the creature or the object is in certain conditions.

In addition, in an embodiment, the object distribution system 10 further includes a microphone (not shown) and allows the user to make or provide recorded voice in advance, and a speaker (not shown) to play the recorded voice. The object distribution system 10 can also receive the user's real-time voice message from the connected personal device and play the real-time voice message in order to provide interactions between the remote user and the pet. Alternatively, the object distribution system 10 can be set to automatically play the recorded voice and actively records the pet's reactions through the microphone and camera, which can be provided to the cloud server or the personal device of the user and the user can review on the personal device at any time. In an embodiment, the user may watch the real-time reactions of the pet on the personal device and operate the personal device to choose whether to cast the objects T out to reward the pet according to the performance of the pet.

In an embodiment, the application software on the personal device and object distribution system also provide settings for automatic casting. The user can operate the personal device to set the object distribution system regularly cast the objects T out. For example, the user can set settings including the casting time frame, the time period between two castings, the amounts of objects T to be casted each time . . . etc. In an embodiment, the user can also to set the object distribution system to automatically cast objects T when a pet enters the view of the camera. In an embodiment, the application software on the personal device or the control module of the object distribution system may determine whether the pet stays in the view of the camera long enough or the pet disappears long enough. If so, the application software on the personal device or the control module of the object distribution system may generate a casting command to cast the objects T following the user's settings.

In an embodiment, the application software and the object distribution system can also provide smart device or IoT device capabilities, which can be set or activated by the user. For example, the object distribution system detects the pet moves into the view of the camera will automatically take photos or videos of the pet movements, and the control module of the object distribution system will upload the captured photos or videos to the AI cloud server via Internet. The AI cloud server can analyze and diagnose the pet's real time status based on the uploaded information. After the AI cloud server generates the diagnosis result, the AI cloud server will inform the user regarding the diagnosis result and second message to the personal device asking the user whether to take action corresponding to the diagnosis result. For example, the AI cloud server send message to the personal device asking the user to approval a casting command for the object distribution system, and the object distribution system will cast objects T to the pet if the user approves. The AI cloud server can also generate notice message to the application software on the personal device in order to show the pet's status records. The user can operate the personal device to set smart casting settings for the AI cloud server and the object distribution system. For example, the user can set the level how strict the AI cloud server shall be in the determinations that the pet needs food. If the user has more than one pet in home, the AI cloud server can recognize each of the pets based on the uploaded images and determine individual status of the pets. The AI cloud server then generates casting command to the object distribution system in order to cast the objects T to the pet which is in need of the objects T.

The application software on the personal device and the object distribution system can also provide automatic pet training function. The object distribution system can control the speaker to play the voice command to the pet, such as "stand", "sit", "hand up" . . . etc. The camera takes real-time photos or videos of the pet's movements after the voice command is played. The control module of the object distribution system uploads the captured photos or videos to AI cloud server via Internet. The AI cloud server determines whether the pet correctly reacts to the played voice command in real time. If the pet reacts correctly, the AI cloud server will generate casting command and transmit to the object distribution system, so the object distribution system will cast the objects T to the pet as reward. The users can use the application software on the personal device to build up the training settings, such as recording voice commands for training and setting the pet's purposed reactions corresponding to the voice commands. During the training operation, the user can watch real-time video of the pet's reactions on the personal device and determinate whether the pet reacts correctly. The determinations made by the user will be transmitted to the AI cloud server. In an embodiment, the AI cloud server also determines whether the pet react correctly and the AI cloud server's determinations will also transmitted to the personal device and be shown with the real time video of the pet. The user can also operate the personal device to make response to the AI cloud server's determinations. Moreover, the user can set a time for activating the training mode, the time intervals between two voice commands played to the pet or the time intervals between two training operations.

In view of the foregoing, in the object supplying assembly provided by the disclosure, the recess of the rotating member rotates along with the rotating member and faces the first space storing the objects, and the partition opening is misaligned with the first space. In this way, when the recess of the rotating member rotates to the position facing the first space, the objects are adapted to enter the recess from the first space. When the recess of the rotating member rotates to the position aligned with the partition opening, the objects located in the recess are adapted to pass through the partition opening. In this way, the rotating member may transport the objects to the partition opening in sequence, and stable output of the objects is thus achieved. In addition, in the object casting assembly provided by the disclosure, the plurality of accommodating portions adapted to accommodate the objects are formed among the blades of the impeller. When the impeller rotates, the accommodating portions face the casting opening by turns, such that the objects located in the accommodating portions are adapted to be casted out from the casting opening in sequence. In this way, the object casting assembly may be adapted to throw any objects of any shapes and capable of passing through the partition opening and entering into the accommodating portions formed among the blades and may throw out the objects of this type in sequence, and stable throwing of the objects of this type is therefore achieved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An object supplying assembly, comprising:
    a storage tank, having a first space adapted to store a plurality of objects and a second space communicating with the first space;
    a rotating member, disposed in the second space, adapted to rotate along an axis, wherein the rotating member comprises only one recess recessed from an outer edge towards the axis, and the recess rotates around with the rotating member, wherein the recess is suitable to accept only one of the objects from the first space;
    a driving module, driving the rotating member to rotate along the axis; and
    a partition board, wherein the rotating member is located between the storage tank and the partition board, and the partition board comprises a partition opening misaligned with the first space,
    a height-limiting member, located at a side of the rotating member away from the partition board,
    wherein when the recess of the rotating member rotates to a first position facing the first space, the recess communicates with the first space and one of the plurality of objects is able to enter the recess from the first space and when the rotating member rotates, the recess passes under the height-limiting member and the height-limiting member blocks the objects piled above the rotating member,
    wherein when the recess of the rotating member rotates to a second position aligned with the partition opening of the partition board, the one of the plurality of objects in the recess is allowed to drop and pass through the partition opening.

2. The object supplying assembly according to claim 1, wherein the second space comprises an internal region and an outer region communicating with each other, the internal region is aligned with the first space, the outer region is misaligned with the first space, and the partition opening corresponds to the outer region.

3. The object supplying assembly according to claim 2, wherein the rotating member rotates along the axis so that the recess cyclically and alternatively passes through the internal region and the outer region, and the object in the recess is able to enter the recess from the first space when the recess is located in the internal region, and the object in the recess is able to pass through the partition opening after being brought to the outer region by the rotating member.

4. The object supplying assembly according to claim 2, wherein the height-limiting member is located at a side of the rotating member away from the partition board and is located between the internal region and the outer region, and a passable height is defined by a distance between the partition board and the height-limiting member.

5. The object supplying assembly according to claim 4, wherein the height-limiting member comprises an inclined structure, and the passable height is a distance between a lower end of the inclined structure and the partition board.

6. The object supplying assembly according to claim 1, wherein the rotating member comprises a conical top portion away from the partition board, and the object is adapted to slide into the recess along the conical top portion.

7. The object supplying assembly according to claim 6, wherein the conical top portion has a perturbation structure, and the perturbation structure is adapted to perturb the objects located in the first space when the rotating member rotates.

8. The object supplying assembly according to claim 1, wherein the driving module comprises a motor and a gear linked to the motor, the partition board is located between the gear and the rotating member, and the gear and the rotating member coaxially and synchronously rotate.

9. The object supplying assembly according to claim 8, wherein the gear has a gear opening aligned with the recess and the partition opening of the partition board, and the object in the recess is allowed to drop and pass through the partition opening and the gear opening when the rotating member rotates to the second position.

10. The object supplying assembly e according to claim 8, wherein the driving module further comprises a reduction gear, the motor and the gear are linked through the reduction gear, and a number of teeth of the reduction gear is less than a number of teeth of the gear.

11. An object casting assembly, comprising:
a container having a hole at a bottom and comprising a first space and a second space connected to the first space, wherein a plurality of objects is stored in the first space, the hole corresponds to the second space and is vertically misaligned to the first space;
a housing, comprising an internal space, a supply opening vertically aligned to the hole of the container to receive one of the objects directly dropped from the container without changing a direction of the one of the objects, and a casting opening, the supply opening and the casting opening communicating with the internal space;
an impeller, located in the internal space, rotatably disposed within the housing, wherein the impeller is vertically misaligned to the first space and comprises a plurality of blades, a plurality of accommodating portions are formed among the blades within the impeller, one of the plurality of accommodating portions receive the one of objects directly dropped from the hole of container through the supply opening, and when the impeller rotates and the one of the accommodating portions faces the casting opening, the one of the objects in the one of the accommodating portions is casted out from the casting opening, flies a distance from the object casting assembly, and lands outside the object casting assembly; and
a driver, driving the impeller to rotate.

12. The object casting assembly according to claim 11, further comprising: a rotating module linked to the housing, wherein the driver drives the impeller to rotate about a first axis, and the rotating module drives the housing to rotate about a second axis to adjust a direction that the casting opening faces.

13. The object casting assembly according to claim 11, wherein the housing comprises a first housing and a second housing, and the first housing and the second housing form the internal space and the casting opening communicating with the internal space, the object casting assembly further comprises a gear, the gear is disposed between the second space and the housing and has a gear opening vertically aligned with the hole and the impeller.

14. An operation method of an object distribution system, comprising steps of:
a control module of the object distribution system receiving an image capturing command;
the control module of the object distribution system controlling a camera unit of the object distribution system to capture an image in response to the image capturing command;
the control module transmitting the captured image to a personal device;
the control module of the object distribution system receiving a target region in the captured image from the personal device;
the control module of the object distribution system determining whether the target region is close or far to the object distribution system; and
the control module of the object distribution system adjusting a casting speed of an object in an object casting assembly of the object distribution system.

15. The operation method of the object distribution system according to claim 14, wherein the object casting assembly of the object distribution system comprises:
a housing, comprising an internal space, a supply opening to receive an object and a casting opening, the supply opening and the casting opening communicating with the internal space,
an impeller, located in the internal space, rotatably disposed within the housing, wherein the impeller comprising a plurality of blades, a plurality of accommodating portions are formed among the blades within the impeller, one of the plurality of accommodating portions receive the object from the supply opening, and when the impeller rotates and the one of the accommodating portions faces the casting opening, the object in the one of the accommodating portions is casted out from the casting opening; and
a driver, driving the impeller to rotate.

16. The operation method of the object distribution system according to claim 15, wherein the object casting assembly of the object distribution system comprises a rotating module linked to the housing, the driver drives the impeller to rotate about a first axis, and the rotating module drives the housing to rotate about a second axis to adjust a direction that the casting opening faces.

17. The operation method of the object distribution system according to claim 16, wherein the rotating module disposed on a bottom portion of the object distribution system is controlled by the control module, and the rotating module rotates the object distribution system or the camera unit.

18. The operation method of the object distribution system according to claim 15, wherein if the target region is close to the object distribution system, the control module controls the camera unit to zoom-in and the control module outputs a command to set a rotation speed of the impeller lower, if the target region is far to the object distribution system, the control module controls the camera unit to zoom-out and the control module outputs a command to set the rotation speed of the impeller faster.

19. The operation method of the object distribution system according to claim 14, after the step of the control module of the object distribution system receiving the target region in the captured image from the personal device, further comprising the control module controlling the camera unit to adjust a focal length of the camera unit, and the control module receiving the captured image from the camera unit and post-processing the captured image to enlarge a partial image of the target region.

20. The operation method of the object distribution system according to claim 14, wherein the control module of the object distribution system controls the object casting assembly to cast the object in the object casting assembly in response to a casting command from the personal device or according to casting settings of the object distribution system.

* * * * *